United States Patent
Godwin

(10) Patent No.: US 8,966,527 B1
(45) Date of Patent: Feb. 24, 2015

(54) SYSTEM AND METHOD FOR MEDIA INSERTS IN A MEDIA DISTRIBUTION SYSTEM

(75) Inventor: John P. Godwin, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/545,592

(22) Filed: Jul. 10, 2012

Related U.S. Application Data

(63) Continuation of application No. 09/978,622, filed on Oct. 16, 2001, now abandoned.

(51) Int. Cl.
- *G06Q 30/02* (2012.01)
- *H04N 21/81* (2011.01)
- *H04N 21/45* (2011.01)
- *H04N 21/442* (2011.01)

(52) U.S. Cl.
CPC ......... *H04N 21/812* (2013.01); *G06Q 30/0241* (2013.01); *H04N 21/4532* (2013.01); *H04N 21/44222* (2013.01)
USPC .............................. 725/34; 725/25; 705/14.4

(58) Field of Classification Search
CPC .............. G06Q 30/0241; G06Q 30/02; G06Q 30/0277; G06Q 30/0251; G06Q 30/0269; H04N 21/812; H04N 21/4532; H04N 21/44222; H04N 21/25891; H04N 7/17318
USPC ........................................................... 725/25
See application file for complete search history.

(56) References Cited

U.S. PATENT DOCUMENTS

| | | | | |
|---|---|---|---|---|
| 5,029,014 A * | 7/1991 | Lindstrom | .................... | 386/249 |
| 5,600,366 A * | 2/1997 | Schulman | ........................ | 725/36 |
| 5,619,274 A * | 4/1997 | Roop et al. | .................... | 348/461 |
| 5,659,350 A * | 8/1997 | Hendricks et al. | ............ | 725/116 |
| 5,774,170 A * | 6/1998 | Hite et al. | ........................ | 725/34 |
| 5,805,974 A * | 9/1998 | Hite et al. | ........................ | 725/69 |
| 5,835,487 A * | 11/1998 | Campanella | ................... | 370/316 |
| 5,886,995 A * | 3/1999 | Arsenault et al. | ............. | 370/477 |
| 5,889,950 A * | 3/1999 | Kuzma | ............................. | 725/37 |
| 5,920,702 A * | 7/1999 | Bleidt et al. | ................... | 709/231 |
| 5,978,649 A * | 11/1999 | Kahn | ............................... | 725/25 |
| 6,002,393 A * | 12/1999 | Hite et al. | ....................... | 715/719 |
| 6,029,045 A * | 2/2000 | Picco et al. | ....................... | 725/34 |
| 6,035,038 A * | 3/2000 | Campinos et al. | ............. | 380/228 |
| 6,035,397 A * | 3/2000 | Campinos et al. | .............. | 380/28 |
| 6,105,060 A * | 8/2000 | Rothblatt | ....................... | 709/219 |
| 6,141,530 A * | 10/2000 | Rabowsky | ...................... | 725/116 |
| 6,157,719 A * | 12/2000 | Wasilewski et al. | .......... | 380/210 |
| 6,160,989 A * | 12/2000 | Hendricks et al. | ............. | 725/36 |
| 6,330,719 B1 * | 12/2001 | Zigmond et al. | .............. | 725/121 |
| 6,473,137 B1 * | 10/2002 | Godwin et al. | ................ | 348/725 |
| 6,546,556 B1 * | 4/2003 | Kataoka et al. | .................. | 725/35 |
| 6,799,326 B2 * | 9/2004 | Boylan et al. | .................... | 725/35 |
| 2001/0003846 A1 * | 6/2001 | Rowe et al. | ..................... | 725/47 |
| 2001/0004733 A1 * | 6/2001 | Eldering | ......................... | 705/14 |
| 2001/0014970 A1 * | 8/2001 | Kamperman et al. | .......... | 725/31 |

(Continued)

*Primary Examiner* — Nasser Goodarzi
*Assistant Examiner* — Michael B Pierorazio

(57) ABSTRACT

A predefined advertising service identifier, or trigger code, is broadcast along with the digital media in a media distribution system, to give explicit insert triggers to re-distributors in a multi-tiered distribution system. These service identifiers are encrypted so that other parties without access to the triggers that are receiving the broadcast cannot identify ad insert time slots and therefore cannot insert ads without prior agreement. In one embodiment, the triggers are contained within pre-existing conditional access control word packets.

23 Claims, 3 Drawing Sheets

(56) References Cited

U.S. PATENT DOCUMENTS

| | | |
|---|---|---|
| 2002/0003884 A1* | 1/2002 | Sprunk ........................ 380/239 |
| 2002/0035730 A1* | 3/2002 | Ollikainen et al. ............. 725/93 |
| 2002/0035731 A1* | 3/2002 | Plotnick et al. ............... 725/146 |
| 2002/0056102 A1* | 5/2002 | Dillon et al. ................... 725/39 |
| 2002/0107940 A1* | 8/2002 | Brassil ......................... 709/219 |
| 2002/0144260 A1* | 10/2002 | Devara ........................... 725/32 |
| 2002/0166120 A1* | 11/2002 | Boylan et al. ................... 725/35 |
| 2003/0070169 A1* | 4/2003 | Beyers et al. ................... 725/51 |
| 2003/0110499 A1* | 6/2003 | Knudson et al. ................ 725/42 |
| 2003/0126594 A1* | 7/2003 | Tsuria et al. ................... 725/25 |
| 2008/0137848 A1* | 6/2008 | Kocher et al. ................. 380/201 |

* cited by examiner

SYSTEM AND METHOD FOR MEDIA INSERTS IN A MEDIA DISTRIBUTION SYSTEM

TECHNICAL FIELD

The present invention relates generally to a system and method for inserting media advertisements in a media distribution system and more particularly to a system and method for inserting media advertisements in a media distribution system having multiple tiers.

BACKGROUND OF THE INVENTION

In the cable and broadcast television industries a major source of revenue is the sale of advertising time or "ad spots". Spots are sold at both national and local levels. In the cable industry, a major programmer, such as CNN and ESPN, includes ads in the signal it distributes to its cable service providers. The signal includes tone cues, or digital signal identifiers, to the provider's equipment and by business agreement, the cable providers can insert ad spots after the tone cues.

A direct broadcast distribution company, or satellite television provider, typically has the right to use the "ad spots", which are reserved for the local cable company spot insert opportunities, for their own inserts. Many ad inserts are intended for viewing by a typical consumer, i.e. pay-per-view events being advertised to a viewer at home. However, there are many instances where the direct broadcast distributor has a specialized distribution agreement which cause the signals to be received and re-distributed by other entities such as restaurants, hotels, office buildings, commercial aircraft, passenger ships, multiple dwelling units, etc.

These specialized redistribution systems are directed to someone other than a typical residential consumer. And therefore, advertisements for an intended audience, such as pay-per-view events, are not accessible to the audience of the re-distribution system and the valuable ad spot is essentially going to waste. For example, a hotel guest, or a passenger on a cruise ship cannot actually purchase an impulse pay-per-view event advertised by the distributor, rendering the ad spot useless.

SUMMARY OF THE INVENTION

It is an object of the present invention to permit a tiered system of commercial inserts. It is a further object of the present invention to broadcast unique trigger identifiers that, in association with special hardware, can be used to access and insert ad spots in a multi-tier system.

According to the present invention, a predefined, unique service identifier is broadcast along with a service identifier in a conditional access system, to give explicit insert triggers to re-distributors in a multi-tiered distribution system. The service identifiers are encrypted in a control word packet (CWP) so that other parties without access to the triggers that are receiving the broadcast cannot insert ads. The present invention uses a small portion of pre-existing conditional access CWP's routinely used for protection and authorization of the digital media itself. A hardware interface is used to identify the encrypted cues that are hidden in the CWP's appearing throughout the transmit bit streams.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
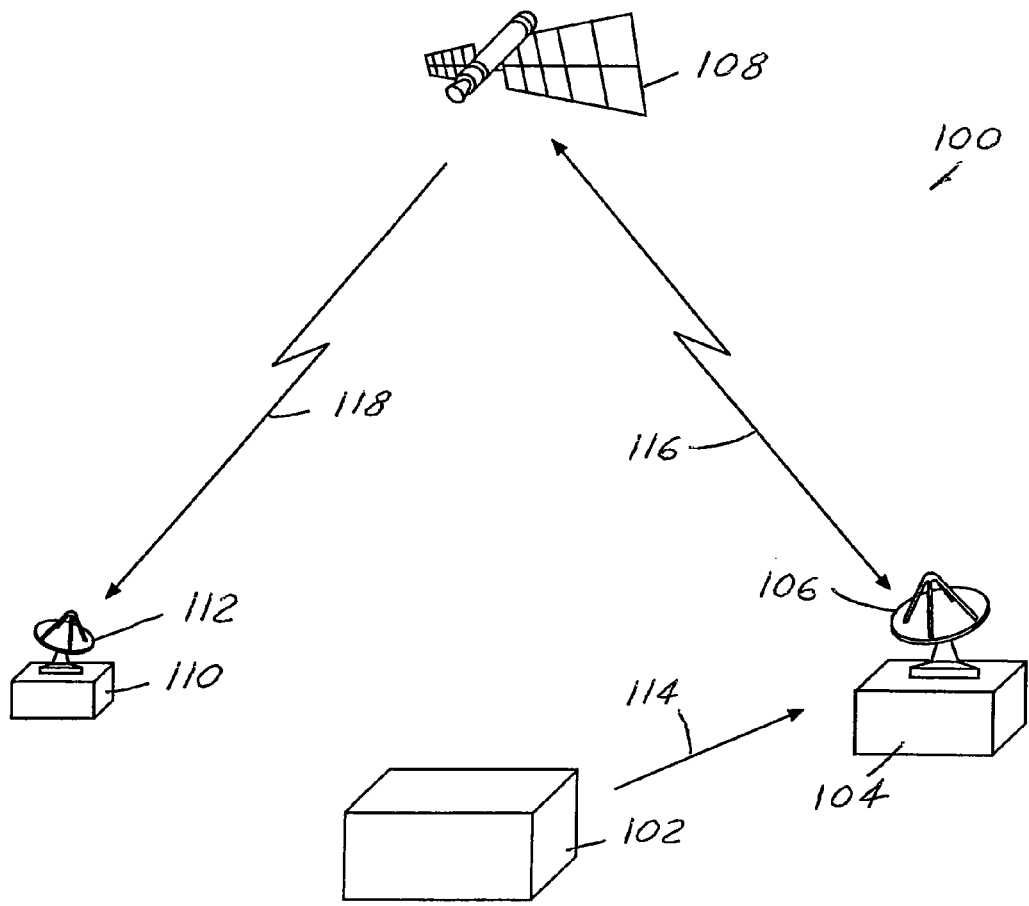
FIG. 1 is a block diagram illustrating an overview of a prior art video distribution system.

FIG. 1 is a diagram illustrating an overview of a multichannel video distribution system 100. The video distribution system 100 comprises an uplink center 104, a satellite 108, a terrestrial receiver 112 and a subscriber 110.

The uplink center 104 receives program material from external sources 102 via a communications link 114, and using an uplink antenna 106, transmits the program material and program control information to the satellite 108 via uplink 116. The satellite receives and transmits the video programs and control information to the subscriber via downlink transmission signal 118. The subscriber 110 receives this information using the terrestrial receiver 112.

Figure 2:
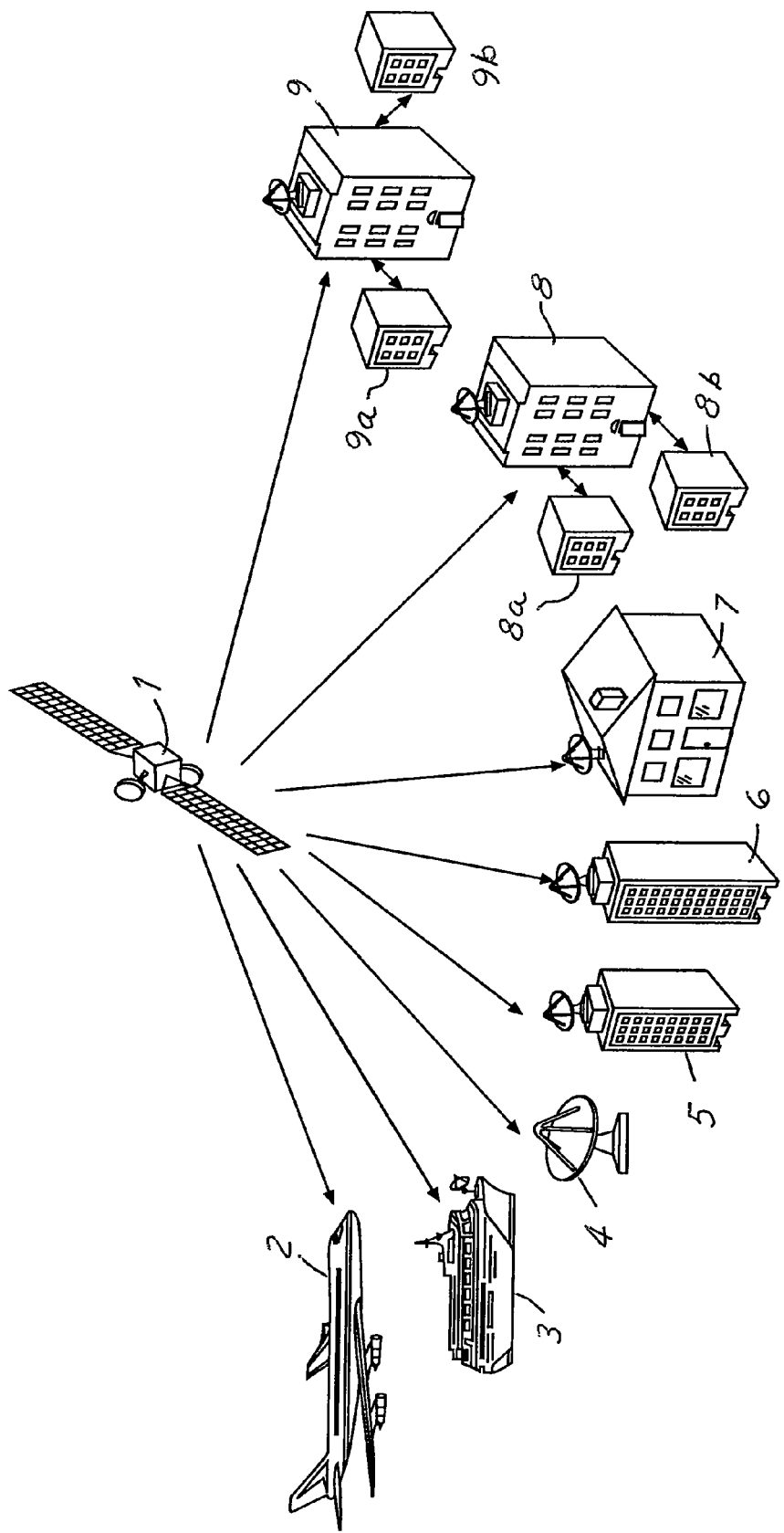
FIG. 2 is an overall system diagram of potential recipients of the distribution of media inserts according to the present invention.

FIG. 2 is an overall system diagram of a direct broadcast satellite (DBS) 1 and potential business entities that may be inclined to take advantage of the advertising time slots when the broadcast ad spots are not applicable to the businesses' customers. It should be noted that the entities shown in FIG. 2 are for example purposes only and are not intended to limit the application of the present invention. The first tier is the DBS broadcaster 1, which broadcasts a signal to either a private or public redistribution system. For example, a private redistribution system may be a commercial airline 2, a passenger ship 3, commercial users 5 such as hotels, restaurants, doctor's offices, etc., multiple dwelling units 6 such as apartments and condominium complexes, private residences 7, and a subdivision, planned community development 8, or resort complex 9. A public redistribution system 4 may be a cable television system or a satellite digital radio audio system.

The number of tiers is not limited to two. In the case of a resort complex 9 or a planned community development 8, there is the possibility of expanding the tiers beyond the two-tier system described above. For example, a resort may have several hotels within the complex. While the overall resort 9 will have general advertisements to insert over the available ad-spots, one hotel 9a within the complex may have the opportunity to insert its own advertisements directed to their target subscribers that may be different from another hotel 9b within the complex.

Similarly, in the case of a planned community development, there may be an individual developer 8a within the community that will have target subscribers that are different from another developer 8b with its own target subscriber. The possibilities for additional tiers are endless and while the detailed description is focusing on two and three tiers, it is possible to apply the present invention beyond three tiers without departing from the scope of the present invention.

Figure 3:
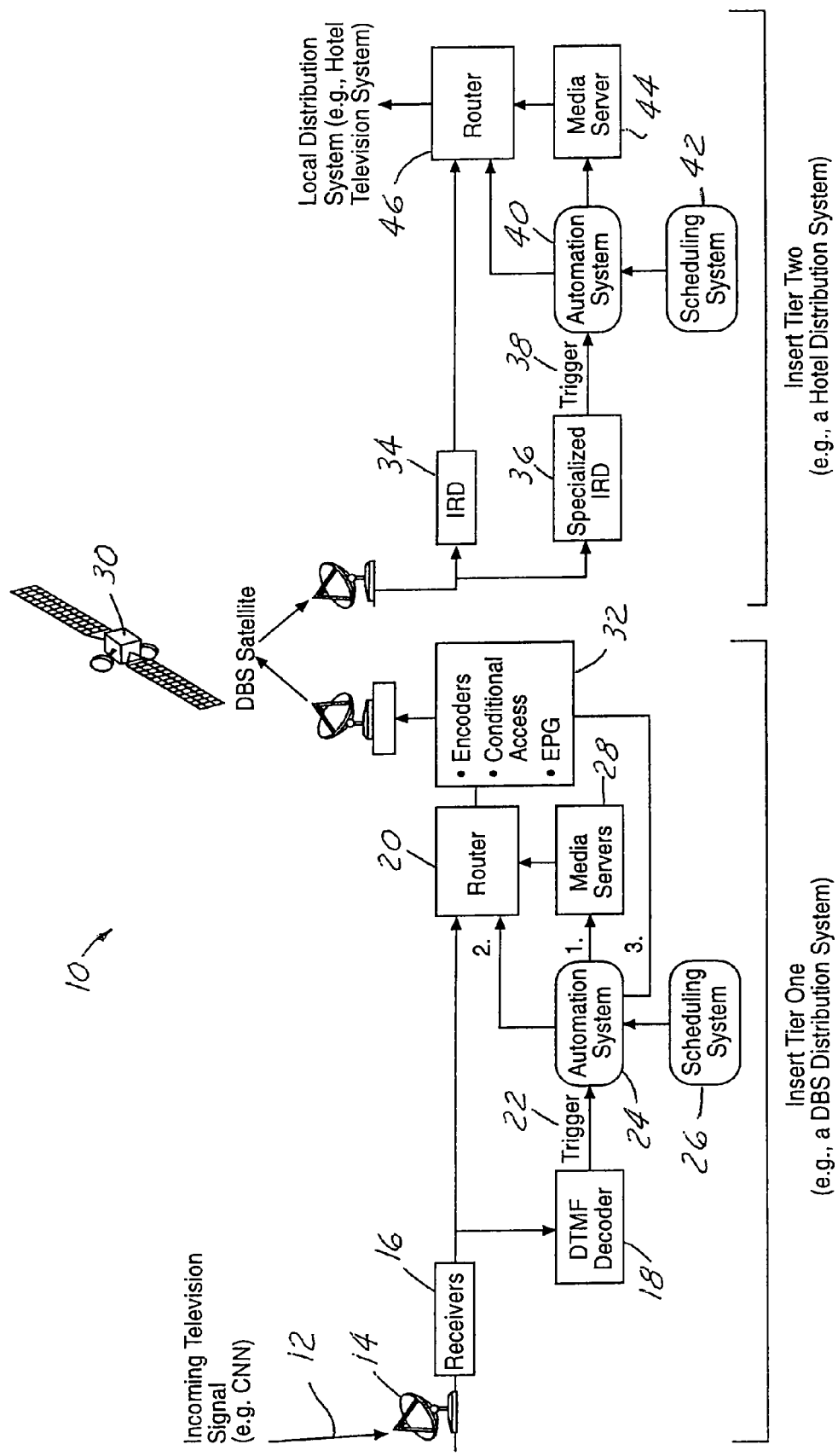
FIG. 3 is a block diagram of a two-tier distribution system according to the present invention.

FIG. 3 is a block diagram of a two-tier distribution system 10. A DBS distributor collects an incoming television signal 12, such as CNN at an antenna 14. A receiver 16 receives the signal and a dual tone multi-frequency (DTMF) decoder 18 detects the tone, or trigger 22, that is supplied by the television signal distributor. An automation system 24. works in conjunction with a scheduling system 26 to insert advertisement material in the correct time slots. A media server 28 holds the material for the inserts and upon instruction by the automation system 24, a router 20 routes the message to be broadcast during the correct time made available by the broadcaster of the incoming television signal 12.

The automation system 24 provides an ad avails identifier, or trigger, to a conditional access system 32. In addition, the conditional access system 32 creates a "tier two insert" service identifier and includes it within the outgoing control word packet. Bits within this service identifier may be used to indicate the duration or some other characteristic of the media insert.

In the DBS case, the signal is received in thousands of very small re-distribution locations. Therefore, the trigger should be hidden, or encrypted, so that it is not possible for an unethical proprietor to insert an ad over the DBS company's inserts without permission. The re-distribution location must have the necessary hardware and software interface to identify the trigger and overlay an advertisement.

An encoder 32 at the tier one distribution system is used to encrypt the control word packet, with the enclosed trigger, that is broadcast along with the advertisement in the ad spot. The encrypted trigger provides a control message to a second or higher tier that has the proper specialized hardware to identify the encrypted trigger.

Further, the encrypted trigger can be hidden within a periodic, or continuous, data stream. An occasional, isolated occurrence of an encrypted signal is easily identifiable, and even though the code itself may not be broken, just the occurrence of an isolated encrypted signal may be enough to allow an unauthorized user access to the ad spot. Therefore, hiding the trigger in a stream of encrypted data, may further prevent unauthorized use of the present invention.

The advertisement is then broadcast by the DBS distribution system by a satellite 30 to a second tier distributor, such as a resort complex television system. Beyond two tiers, in most cases, the receiving tier that is also distributing will have the same hardware as the second tier distributor shown in FIG. 3. Any recipient of the re-distribution must have the specialized receiver to detect the encrypted trigger and overlay an insert message.

In special applications, such as a resort having several hotels within the resort complex that are all owned by the same company, there may not be a need to encrypt and decode the trigger once it has passed the second tier. In the case of a planned community development, however, the need for encryption beyond the second tier may still be necessary to prevent unscrupulous developers from having access ad spots that they are not paying for.

The signal, containing the encrypted trigger is broadcast by the DBS satellite 30 to the second tier distributor, or re-distributor in the case of tiers beyond a second tier. The re-distributor has equipment similar to that of the DBS distributor and receives the signal at a receiver 34. An additional receiver, a specialized receiver 36 at the re-distributor, also receives the signal and detects the encrypted trigger 38.

Figure 4:
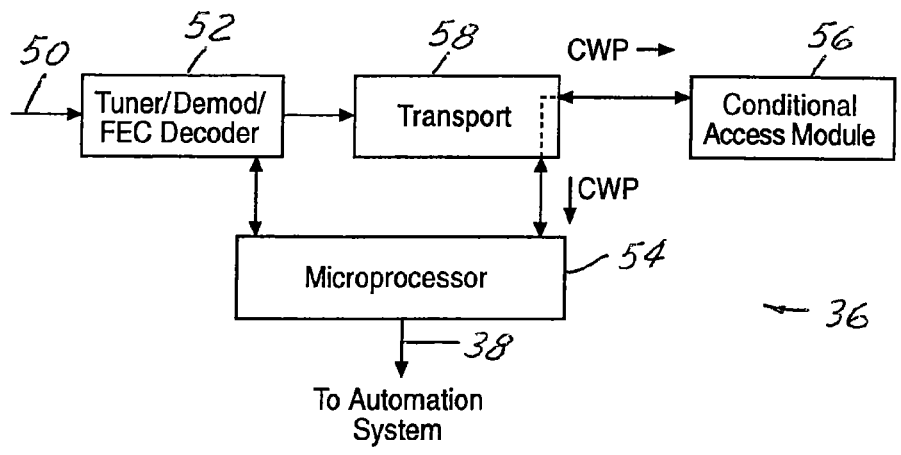
FIG. 4 is a block diagram of the specialized receiver required at the receiving tier according to the present invention.

FIG. 4 is a block diagram of the specialized receiver 36. The incoming signal 50 is tuned, demodulated and decoded 52. A microprocessor 54 causes a transport circuit 58 to route all control word packets (CWP) for the television signal to a conditional access module 56. The conditional access module 56 is authorized to decrypt the control word packets with the trigger for the ad spot. The conditional access module 56 will send the decrypted control word packet back to the microprocessor, which sends the trigger information to the automation system (not shown in FIG. 4).

Once the encrypted trigger is identified, the re-distributor overlays their media insert in the ad spot in a manner similar to the automation and scheduling system at the tier one distributor. Referring again to FIG. 3, the re-distributor has an automation system 40 that works in conjunction with a scheduling system 42 to take the appropriate material from a media server 44 and by way of a router 46, overlays the targeted ad over the available spot.

A specific example will provide an overview of the present invention. The DBS system receives an incoming television signal from a cable television company, such as CNN. Through business agreements, certain ad spots are made available by CNN for the DBS company to overlay their own media inserts over the ad spots on CNN. The DBS system identifies the DTMF tone sent in the CNN television signal and inserts an advertisement for a pay-per-view sporting event in the identified ad time slot.

According to the present invention, the DBS system adds an encrypted trigger to the broadcast signal. The pay-per-view advertisement is then broadcast by the DBS satellite to multiple subscribers. One of the many subscribers that receive the signal is a resort complex whose guests cannot purchase pay-per-view events directly from the DBS company. The resort complex has a main distribution center having a specialized receiver that identifies the encrypted trigger sent with the pay-per-view advertisement and inserts their own advertisement in the spot.

As an example of a third tier, assume there are several hotels in the resort that receive the advertisement from the resort's main distribution center. In certain instances it may be desirable for a particular hotel to broadcast its own advertisements over the resort's overlay. In this case, encryption of the resort's trigger signal may not be necessary. However, in the case of hotels that are competing within the resort, it may be desirable to protect the trigger. This requires the resort main distribution center to encrypt the trigger and the hotel receiving the encrypted trigger must have a specialized IRD to detect and decrypt the trigger and overlay their targeted advertisement.

According to the present invention, the re-distributor, or tier-two distributor such as a hotel, that cannot provide its intended audience with access to the pay-per-view event and can then insert its own targeted advertisement. In this regard, the valuable ad spot is serving its intended purpose without being rendered useless by being broadcast to an uninterested audience.

It is to be understood that the preceding description of the preferred embodiment is merely illustrative of some of the many specific embodiments that represent applications of the principles of the present invention. For example, the present invention is not limited to a television signal and may be applied to a satellite digital audio radio system for example. The invention covers all alternatives, modifications, and equivalents, as may be included within the spirit and scope of the appended claims.

What is claimed is:

1. A method of transmitting program material, comprising the steps of:

receiving a signal from a signal distributor in the first tier of a distribution system, the signal having the program material including a first message and a first trigger delineating the first message;

generating conditional access information, the conditional access information for providing conditional access to at least a portion of the program material;

detecting the first trigger in the signal;

inserting a second message in place of the first message according to the detected first trigger;

determining that a third message is permitted to be inserted in place of the second message by a second tier of the distribution system:

inserting a second trigger delineating the third message into the conditional access information;

encrypting the conditional access information having the second trigger; and transmitting the program material and the encrypted conditional access information to a second tier of the distribution system.

2. The method of claim 1, wherein the conditional access information provides conditional access to the second message.

3. The method of claim 1, wherein the conditional access information provides conditional access to the third message.

4. The method of claim 1, wherein:
the conditional access information is contained in a control word packet; and
the second tier comprises a receiver having a conditional access module for decrypting the control word packet to obtain the second trigger.

5. The method of claim 1, wherein the second trigger comprises a duration code specifying a duration of the third message.

6. The method of claim 1, further comprising the steps of:
receiving the program material and the conditional access information in the second tier;
decrypting the conditional access information to detect the second trigger; and
inserting the third message in response to the detection of the second trigger.

7. The method of claim 6, wherein the second message replaces the first message inserted by the signal distributor.

8. The method of claim 6, wherein the third message replaces the second message inserted by the first tier.

9. The method of claim 6, wherein the conditional access information is contained in a data packet and the steps of decrypting the conditional access information to obtain the second trigger comprises the steps of:
routing the data packet to a conditional access module; and
decrypting the data packet in the conditional access module.

10. A method of receiving program material, comprising the steps of:
receiving a signal in a second tier of a multi-tier distribution system from a first tier of the multi-tier distribution system, the signal comprising:
program material having a first message inserted by a signal distributor or a second message inserted by the first tier; and
encrypted conditional access information for controlling access to at least some of the program material, the encrypted control access information comprising a first trigger inserted by the first tier in response to detection of a second trigger placed into the program material by the signal distributor and according to a determination that a third message is permitted to be inserted in place of the second message by a second tier of the distribution system;

decrypting the encrypted conditional access information;
detecting the second trigger in the decrypted conditional access information; and
inserting a third message for the second message according to the detected second trigger.

11. The method of claim 10, wherein:
the conditional access information is contained in a control word packet; and
the second tier comprises a receiver having a conditional access module for decrypting the control word packet to obtain the second trigger.

12. The method of claim 10, wherein the second trigger comprises a duration code specifying a duration of the second message.

13. An apparatus for transmitting program material, comprising:
a first tier receiver for receiving a signal from a signal distributor in a first tier of a multi-tier distribution network, the signal having the program material including a first message and a first trigger delineating the first message;
a conditional access system, for generating conditional access information for providing conditional access to the program material;
an automation system for detecting a first trigger in the signal and for inserting a second message in place of the first message according to the detected first trigger;
an encoder for inserting a second trigger into the conditional access information according to the detected first trigger, wherein the encoder inserts the second trigger into the conditional access information according to a determination that a third message is permitted to be inserted in place of the second message by a second tier of the distribution system and wherein the conditional access system encrypts the conditional access information and the second trigger to produce encrypted conditional access information; and
a transmitter for transmitting the program material and the encrypted conditional access information to a second tier of a multi-tier distribution network.

14. The apparatus of claim 13, wherein the conditional access information provides conditional access to the second message.

15. The apparatus of claim 13, wherein:
the conditional access information is contained in a control word packet;
the second tier comprises a second tier receiver having a conditional access module for decrypting the control word packet to obtain the second trigger.

16. The apparatus of claim 13, wherein the second trigger comprises a duration code specifying a duration of the second message.

17. The apparatus of claim 13, wherein the second tier further comprises:
a second tier receiver, for receiving the program material and the conditional access information, for decrypting the conditional access information to obtain the second trigger, and for inserting a second message in response to the detection of the first trigger.

18. The apparatus of claim 17, wherein the second tier receiver replaces the first message with the second message.

19. The apparatus of claim 17, wherein the second tier receiver replaces a third message inserted by the first tier with the second message.

20. The apparatus of claim 17, wherein the conditional access information is contained in a data packet and wherein the second tier receiver comprises:

a transport module for routing the data packet; and a conditional access module for receiving the routed data packet and decrypting the data packet.

21. An apparatus for transmitting program material comprising:

a receiver, for receiving a signal in a second tier of a multi-tier distribution system from a first tier of the multi-tier distribution system, the signal comprising:

program material having a first message inserted by a signal distributor or a second message inserted by the first tier;

encrypted access control information for controlling access to the program material, the encrypted access control information comprising a second trigger inserted by the first tier in response to detection of a first trigger placed into the program material by the signal distributor and according to a determination that a third message is permitted to be inserted in place of the second message by a second tier of the distribution system;

a conditional access module for decrypting the encrypted access control information; and an automation module for detecting if the second trigger is detected in the decrypted control access information and inserting a third message for the first message or the second message only if the second trigger is detected in the decrypted control access information.

22. The apparatus of claim 21, wherein:

the control access information is contained in a data packet; and the receiver comprises a conditional access module for decrypting the data packet to obtain the second trigger.

23. The apparatus of claim 21, wherein the second trigger comprises a duration code specifying a duration of the third message.

* * * * *